United States Patent
Mehraban et al.

(10) Patent No.: US 6,745,829 B2
(45) Date of Patent: Jun. 8, 2004

(54) SYSTEM FOR AIR CONDITIONING OF THE INTERIOR OF AN AUTOMOBILE

(75) Inventors: Henry Mehraban, Northville, MI (US); John J. Meyer, Northville, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/996,840

(22) Filed: Nov. 29, 2001

(65) Prior Publication Data

US 2003/0098148 A1 May 29, 2003

(51) Int. Cl.⁷ .......................... F25B 29/00; B60H 1/00; B60H 3/00
(52) U.S. Cl. ................. 165/203; 165/42; 165/43; 62/434; 62/435; 62/244; 237/12.3 B
(58) Field of Search ................. 165/42, 43, 203; 62/434, 435, 244; 237/12.3 B

(56) References Cited

U.S. PATENT DOCUMENTS

| | | | |
|---|---|---|---|
| 2,774,222 A | * 12/1956 | Jacobs et al. | 165/43 |
| 2,787,129 A | * 4/1957 | Evans | 165/43 |
| 3,059,449 A | * 10/1962 | Dilliner | 165/43 |
| 3,753,462 A | 8/1973 | Burger | 165/42 |
| 3,830,077 A | * 8/1974 | Willen et al. | 165/43 |
| 3,990,505 A | * 11/1976 | Davenport | 165/43 |
| 3,999,598 A | 12/1976 | Fehr et al. | 165/42 |
| 4,260,103 A | * 4/1981 | Herring, Jr. | 237/12.3 B |
| 4,591,691 A | * 5/1986 | Badali | 237/12.3 B |
| 4,705,214 A | * 11/1987 | Johnson | 237/12.3 B |
| 4,724,898 A | 2/1988 | Stolz et al. | 165/42 |
| 5,048,299 A | 9/1991 | Retallick | 62/244 |
| 5,048,752 A | * 9/1991 | Hintennach et al. | 237/12.3 B |
| 5,123,594 A | * 6/1992 | Humburg | 237/12.3 B |
| 5,265,437 A | * 11/1993 | Saperstein et al. | 62/435 |
| 5,586,721 A | * 12/1996 | Humburg | 237/12.3 B |
| 5,904,052 A | 5/1999 | Inoue et al. | 62/244 |
| 6,109,045 A | 8/2000 | Takenaka | 62/236 |
| 6,405,793 B1 | * 6/2002 | Ghodbane et al. | 165/43 |
| 6,435,273 B1 | * 8/2002 | Futernik | 165/42 |

FOREIGN PATENT DOCUMENTS

IT                473662    *  8/1952    ............ 237/12.3 B

* cited by examiner

*Primary Examiner*—John K. Ford
(74) *Attorney, Agent, or Firm*—Brinks Hofer Gilson & Lione

(57) ABSTRACT

This invention provides an auxiliary heating and cooling circuit for an automobile interior compartment. The auxiliary circuit uses a circulated liquid heat transfer fluid such as the same liquid used for the vehicle engine system. In a cooling mode, the liquid is circulated through a heat exchanger within the vehicles air-conditioning circuit. The cooled fluid flows to an auxiliary heat exchanger where cooled air is made available. In a heating mode, the auxiliary system is connected directly with the engines cooling system where the hot engine coolant flows through the auxiliary heat exchanger for interior compartment heating.

12 Claims, 2 Drawing Sheets

SYSTEM FOR AIR CONDITIONING OF THE INTERIOR OF AN AUTOMOBILE

TECHNICAL FIELD AND BACKGROUND OF THE INVENTION

The invention relates to systems for providing desired temperature throughout the interior of an automobile.

The invention allows for cooling and heating passengers in the rear seats in a motor vehicle without requiring an auxiliary evaporator. In most vehicles today, passengers in the back seat are cooled by: a) air from the front registers; or b) air from the front end evaporator ducted to the back seat; or c) an auxiliary evaporator with dedicated thermal expansion valves and blower.

In this invention, the above three systems are improved, through the use of a liquid anti-freeze such as glycol flowing in a pipe line (hard or bendable) which is cooled by a refrigerant stream or heated by the engine block and routed to the rear seat area. Small heat exchangers with dedicated fans will allow each rear seat passenger to control the comfort level in the immediate environment.

The following prior art patents relate to this field but do not teach the improvement achieved by this invention: 3,753,462; 3,999,598; 4,724,898; 5,048,299; and 5,904,052.

SUMMARY OF THE INVENTION

The system of this invention uses a heat transfer fluid, preferably the same fluid as used in the engine coolant, namely, a mixture of water and glycol anti-freeze. The stream of the heat transfer fluid can be either hot because it comes from the engine or cooled by an air conditioning heat exchanger before being routed to the rear of the vehicle. Rear seat passengers will then have control of the thermal comfort in their zone.

Anti-freeze, namely a mixture of ethylene glycol and water (referred to in this specification as "anti-freeze" or "glycol"), can be used in small tubing which is much more compact than the ducts used currently for air flow. The tubing carrying the liquid anti-freeze is in interface with heat exchangers that are packaged in a variety of locations. Thus, cooling is provided without bulky air flow ducts to the rear of the vehicle and without requiring expensive high pressure refrigerant circuit tubing plumbed into the rear compartment area of the vehicle.

Cooling of the glycol may take place in the refrigerant line after the air conditioning system evaporator or within the evaporator (in terms of refrigerant flow). This packaging arrangement reduces the potential for thermal stratification in the evaporator due to the super heat region. In the rear of the vehicle, the glycol tubing can be delivered to one or more heat exchangers. For a simple multi-zone system, only one rear heat exchanger is required. However, there is the option to add as many heat exchangers as feasible to reach optimum passenger comfort.

Other general and more specific aspects of this invention will be set forth in the ensuing description and claims.

BRIEF DESRIPTION OF THE DRAWINGS

The drawings that will now be briefly described are incorporated herein to illustrate a preferred embodiment of the invention and a best mode presently contemplated for carrying out the invention.

Figure 1:
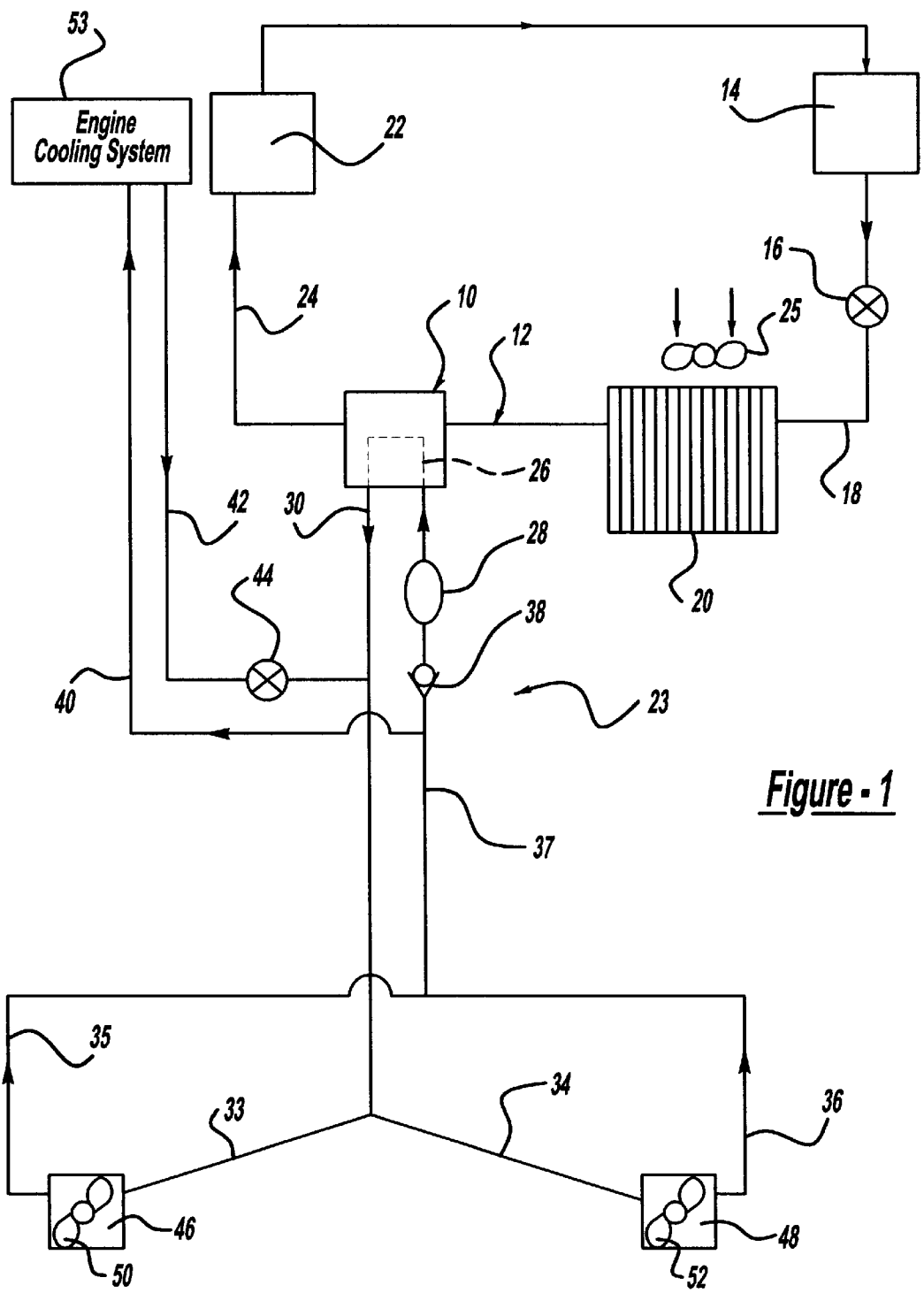
Figure 2:
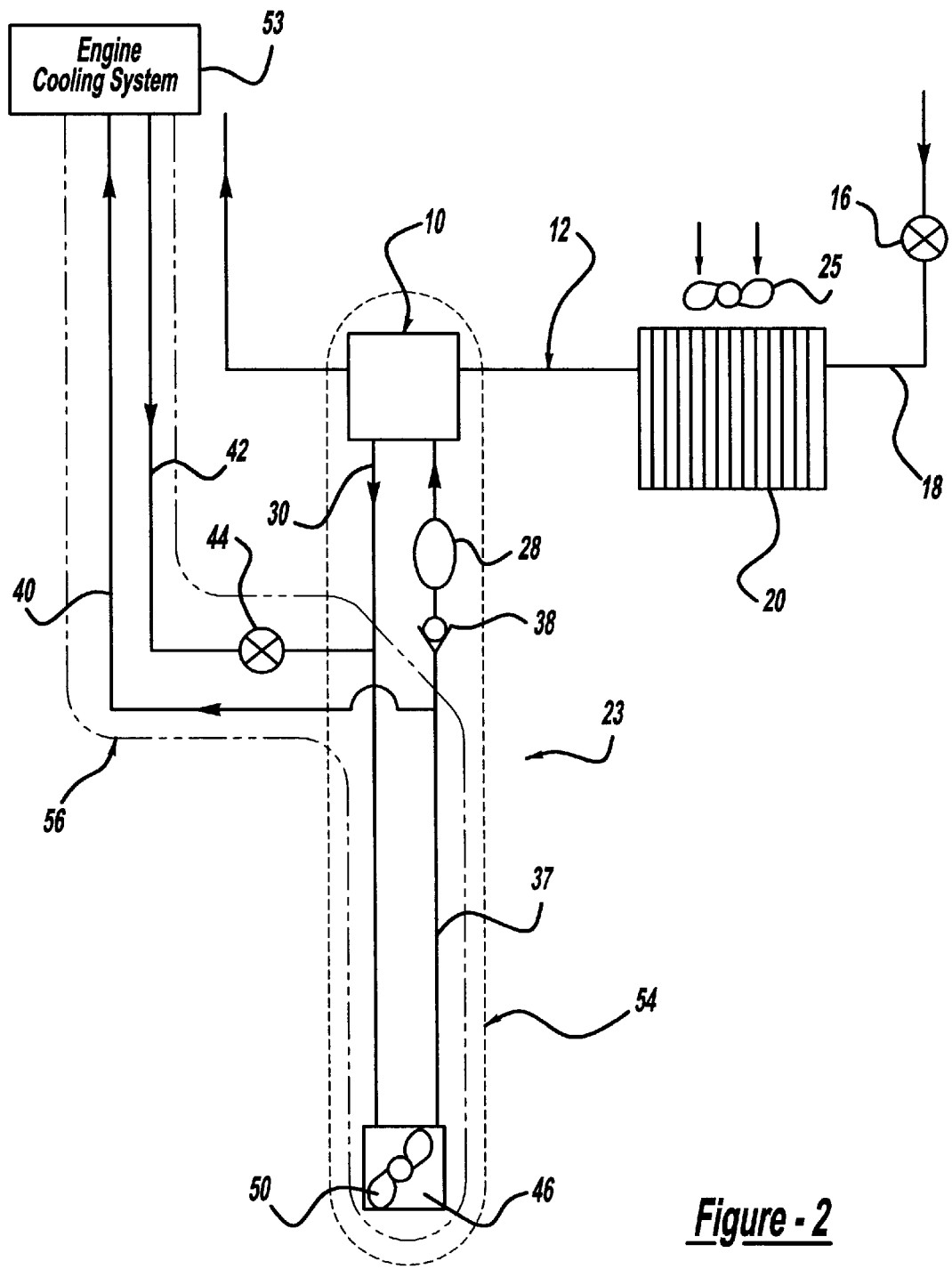

FIG. 1 is a schematic diagram of apparatus for heating and cooling the interior of a motor vehicle and provision for such air conditioning of remote locations in the vehicle; and FIG. 2 is a schematic diagram similar to FIG. 1 showing the apparatus but showing the components provided for heating and cooling as separate groups.

DETAILED DESCRIPTION OF THE PREFERRED EMBODIMENTS

The following description of the preferred embodiment of the invention is not intended to limit the scope of the invention that is described, but rather to enable a person skilled in the art to make and use the invention. Referring to the drawings, like reference numerals are used to designate like parts throughout. Looking first at FIG. 1, the present invention consists of a heat exchanger 10 that forms a part of a refrigerant cooling circuit 12. An air conditioner condenser is shown at 14. A thermal expansion valve 16 is downstream from the condenser 14 through tubing 18. From the expansion valve 16, the stream of refrigerant passes through an evaporator 20 and then through the heat exchanger 10 and then to the compressor 22 through pipe 24.

The previously described elements of circuit 12 including condenser 14, expansion valve 16, tubing 18, evaporator 20, and compressor 22 comprise components of a conventional motor vehicle air conditioning circuit. Air is directed through evaporator 20 by fan 25 where heat is absorbed from the air and expelled into the interior compartment of the automobile for cooling the interior compartment. These above described elements are collectively referred to as refrigerant cooling circuit 12.

In accordance with this invention, an auxiliary heating and cooling circuit 23 is provided. Auxiliary heating and cooling circuit 23 including a tubular internal heat exchanger member 26, which receives liquid anti-freeze from pump 28. The anti-freeze enters the heat exchanger 10 at tube 26. The tubing 26 carries liquid glycol under pressure from the pump 28 through the heat exchanger 10 so as to transfer heat between the glycol and the refrigerant. The glycol flows through heat exchange member 26 and exits via tubing 30. The tubing 26 at the entrance to the heat exchanger 10 and the glycol leaving the heat exchanger is connected with sections of tubing 30, 33, 34, 35, 36, and 37.

Coolant lines 40 and 42 join with the tubing sections 37 and 30, respectively, as seen in FIG. 1. The line 42 passes through a valve 44 which, when open, provides anti-freeze into line 30 which connects with lines 33 and 34 which provide glycol to the heat exchangers 46 and 48 which are positioned in the rear of the seats in the automobile. Lines 33 and 34 are connected fluidly in parallel, namely, the flow through line 30 splits between lines 33 and 34. Heat exchangers 46 and 48 are provided with fans 50 and 52 to disperse the conditioned air.

Auxiliary heating and cooling circuit 23 described previously can be operated in two different internal vehicle climate control modes; namely, auxiliary heating and auxiliary cooling. In the case of auxiliary cooling, pump 28 is activated which circulates glycol through heat exchanger 10 and thereafter through tubing 30 to the rear auxiliary heat exchangers 46 and 48. Since the refrigerant flowing through tubing 24 is cooled, the cooler refrigerant flowing within heat exchanger 10 removes heat from the glycol circulating within internal heat exchange member 26. Accordingly, the glycol temperature entering heat exchanger 10 is warmer than its temperature when it exits heat exchange member 26 via tubing 30. This cooled glycol is then directed through heat exchangers 46 and 48 where cool air is available for rear seat occupants.

In the heating mode of operation, pump 28 is deactivated and valve 44 is opened. Line 42 is plumbed into the existing motor vehicle cooling system that includes its own engine driven water pump. Similarly, line 40 is connected to return engine coolant to the engine cooling system 53. In this mode of operation, the engine coolant that is considerably warmer than ambient temperature flows through valve 44 and into line 30 where it is directed through heat exchanger 46 and 48. The flow then returns via tubing 37 back into line 40. Since check valve 38 is present, the flow of glycol antifreeze is not permitted to flow through heat exchanger 10 in this mode of operation. Check valve 38 operates to only permit flow in the direction of the arrows shown adjacent to heat exchanger 10.

Now with reference to FIG. 2, the two modes of operation of auxiliary heating and cooling circuit 23 are further illustrated. In this figure, only a single auxiliary heat exchanger 46 is illustrated. The dotted line section of circuit 23 operating in the cooling mode is designated by the elements enclosed within dotted line 54. Conversely in the heating mode of operation, the components enclosed by dotted line 56 are activated. FIG. 2 also illustrates that the number of auxiliary heat exchangers (46 and 48) is a function of the design objectives for the vehicle application.

In light of the specification, it is seen that small heat exchangers 46 and 48 with dedicated fans 50 and 52 will allow each rear seat passenger to control the comfort level in hers/his immediate environment. These objectives are achieved by the use of a heat transfer fluid (preferably the same used for the engine coolant, namely glycol) stream that will be either heated by the engine or cooled by the refrigerant cooling circuit 21 before being routed to the rear of the vehicle. Rear seat passengers will then have control of the thermal comfort in their zone. Glycol lines shown in FIG. 1 are much more compact than ducts now in use for air flow and thus the heat exchangers can be packaged in a variety of locations. This solution also eliminates noise and vibration attributed to the use of auxiliary thermal expansion valves. Cooling of the glycol may take place in the refrigerant line (preferentially) after the evaporator. This packaging arrangement will also reduce the potential for thermal stratification in the evaporator 20.

An additional advantageous feature of this invention is that the heat transfer fluid for system 23 is the same as that normally used in the engine cooling system 53 of a typical motor vehicle. Also, flushing of the cooling system 53 will also flush system 23. Thus, system 23 will impose minimal additional maintenance steps for the associated motor vehicle.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology that has been used is intended to be in the nature of words and description rather than of limitation.

We claim:

1. An auxiliary heating and cooling system comprising:
   a refrigerant cooling circuit for cooling an interior compartment of a motor vehicle, said refrigerant cooling circuit including a condenser and an evaporator coupled to an expansion valve, a fan, and a compressor, said evaporator cooling air blown into the interior compartment by a fan;
   an engine cooling system including an engine coolant circuit which provides a source of heated liquid engine coolant for heating the interior compartment, said engine coolant circuit including a valve;
   an auxiliary coolant circuit including a pump, a two circuit heat exchanger and an auxiliary heat exchanger, said auxiliary heat exchanger located in a rear compartment area of the motor vehicle, and said auxiliary coolant circuit being in fluid communication with said engine coolant circuit;
   wherein said two circuit heat exchanger is also coupled with said refrigerant cooling circuit, said two circuit heat exchanger transferring heat from said auxiliary coolant circuit to said refrigerant cooling circuit while isolating refrigerant in said refrigerant cooling circuit from coolant in said auxiliary coolant circuit; and
   wherein in a cooling mode said pump circulates said coolant via said auxiliary coolant circuit between said two circuit heat exchanger and said auxiliary heat exchanger, and in a heating mode said pump is deactivated and said valve is opened and
   a check valve located in said auxiliary coolant circuit and configured to prevent flow of said coolant through said two circuit heat exchanger thereby redirecting said coolant to flow between said auxiliary exchanger and said engine cooling system bypassing said two circuit exchanger.

2. The auxiliary heating and cooling system of claim 1 wherein said coolant is a mixture of ethylene glycol and water.

3. The auxiliary heating and cooling system of claim 1 wherein a fan is provided to generate air flow through said auxiliary heat exchanger.

4. The auxiliary heating and cooling system of claim 1 wherein at least a third heat exchanger is provided placed in a parallel flow relationship with said auxiliary heat exchanger.

5. The auxiliary heating and cooling system of claim 4 wherein said third heat exchanger is located in a rear compartment area of the motor vehicle.

6. The auxiliary heating and cooling system of claim 1 wherein said two circuit heat exchanger is connected in said refrigerant cooling circuit at a position receiving refrigerant after said refrigerant flows through said evaporator.

7. An auxiliary heating and cooling system for a motor vehicle comprising:
   a refrigerant cooling system having an evaporator and refrigerant lines connecting said evaporator with an expansion valve and a compressor, said evaporator adapted to cool air blown into a forward compartment of the motor vehicle;

a first heat exchanger connected with said refrigerant cooling circuit and having an internal liquid flow path, said first heat exchanger transferring heat from a liquid in said internal liquid flow path to the refrigerant while isolating said refrigerant and said liquid;

a first liquid circuit including a pump and a second heat exchanger, said second heat exchanger disposed in a rear compartment of the motor, said first liquid circuit transferring said liquid between said first heat exchanger and said second heat exchanger;

a second liquid circuit including a valve, said second liquid circuit selectively coupled to said first liquid circuit and adapted to transfer said liquid between said second heat exchanger and an engine cooling system;

wherein in an auxiliary cooling mode, said pump is activated to circulate said liquid in said first liquid circuit, between said first heat exchanger and said second heat exchanger and wherein in an auxiliary heating mode, said pump is deactivated, said valve is opened, and a check valve located in said first liquid circuit and configured to prevent flow of said liquid through said check valve to said first heat exchanger thereby redirecting said liquid to flow through said second liquid circuit between said second heat exchanger and said engine cooling system bypassing said first heat exchanger.

8. The auxiliary heating and cooling system of claim 7 wherein a fan is provided to generate air flow through said second heat exchanger.

9. The auxiliary heating and cooling system of claim 7 wherein at least a third heat exchanger is provided placed in a parallel flow relationship with said second heat exchanger.

10. The auxiliary heating and cooling system of claim 7 wherein said second heat exchanger is located in a rear compartment area of said motor vehicle.

11. The auxiliary heating and cooling system of claim 7 wherein said first heat exchanger is connected in said refrigerant cooling circuit at a position receiving refrigerant after said refrigerant flows through an evaporator.

12. The auxiliary heating and cooling system of claim 7 wherein said liquid is a mixture of ethylene glycol and water.

* * * * *